United States Patent [19]

Tarbox

[11] Patent Number: 4,881,793
[45] Date of Patent: Nov. 21, 1989

[54] OPTICAL FIBRE ATTENUATORS AND METHOD FOR MAKING SAME

[75] Inventor: Eleanor J. Tarbox, Southampton, England

[73] Assignee: Pirelli General plc, London, England

[21] Appl. No.: 198,145

[22] Filed: May 24, 1988

[30] Foreign Application Priority Data

Jun. 4, 1987 [GB] United Kingdom ............... 8713081

[51] Int. Cl.$^4$ .................... G02B 6/38; C03C 25/02
[52] U.S. Cl. .................... 350/96.21; 350/96.10;
350/96.20; 350/96.29; 350/96.34; 350/320;
65/3.12; 65/4.1; 65/4.2
[58] Field of Search ............ 350/96.15, 96.20, 96.21,
350/96.29, 96.30, 96.34, 320, 96.10; 65/3.12,
4.1, 4.2

[56] References Cited

U.S. PATENT DOCUMENTS

| | | | |
|---|---|---|---|
| 3,806,224 | 4/1974 | MacChesney et al. | 65/3.12 X |
| 4,217,027 | 8/1980 | MacChesney et al. | 65/3.12 X |
| 4,334,903 | 6/1982 | MacChesney et al. | 65/3.12 X |
| 4,367,013 | 1/1983 | Guerder et al. | 350/96.34 |
| 4,616,901 | 10/1986 | MacChesney et al. | 350/96.34 |
| 4,666,247 | 5/1987 | MacChesney et al. | 350/96.34 |
| 4,718,746 | 1/1988 | Chrepta | 350/96.21 |
| 4,721,351 | 1/1988 | Goepfert et al. | 350/96.15 |
| 4,723,828 | 2/1988 | Garel-Jones et al. | 350/96.15 |
| 4,728,170 | 3/1988 | Robertson | 350/96.15 |
| 4,743,086 | 5/1988 | Hicks, Jr. | 350/96.15 |
| 4,804,248 | 2/1989 | Bhagavatula | 350/96.15 |
| 4,826,288 | 5/1989 | Mansfield et al. | 350/320 |

FOREIGN PATENT DOCUMENTS

| | | |
|---|---|---|
| 2816846 | 10/1979 | Fed. Rep. of Germany ... 350/96.20 X |
| 3042587 | 4/1982 | Fed. Rep. of Germany ... 350/96.15 X |
| 52-64950 | 5/1977 | Japan ............... 350/96.20 X |
| 54-2754 | 2/1979 | Japan ............... 350/96.20 X |
| 59-60414 | 4/1984 | Japan ............... 350/96.15 X |
| 2166257A | 4/1986 | United Kingdom ...... 350/96.20 X |

OTHER PUBLICATIONS

Patent Abstracts of Japan vol. 3, no. 25 (E-94), Feb. 28, 1979; & JP-A-542754 (Tokyo Shibaura Denki K.K.) 01.10.79.
Patent Abstracts of Japan, vol. 6, no. 62 (P-111)[940] Apr. 21, 1982 & JP-A-57 4006 (Tokyo Shibaura Denki K.K.) 09-01-1982.

Primary Examiner—William L. Sikes
Assistant Examiner—Brian M. Healy
Attorney, Agent, or Firm—Brooks Haidt Haffner & Delahunty

[57] ABSTRACT

An attenuating device 10 for use with signal carrying optical fibres 14 comprises a length 18 of optical fibre coiled within a casing 16. The optical fibre length 18 is of higher attenuation per unit length than the optical fibres 14 and the device comprises means, for example optical fibre tails 22,24 fusion spliced at 20,22 to the opposite ends of the length 18 for optically connecting those ends to the fibres 14.

16 Claims, 1 Drawing Sheet

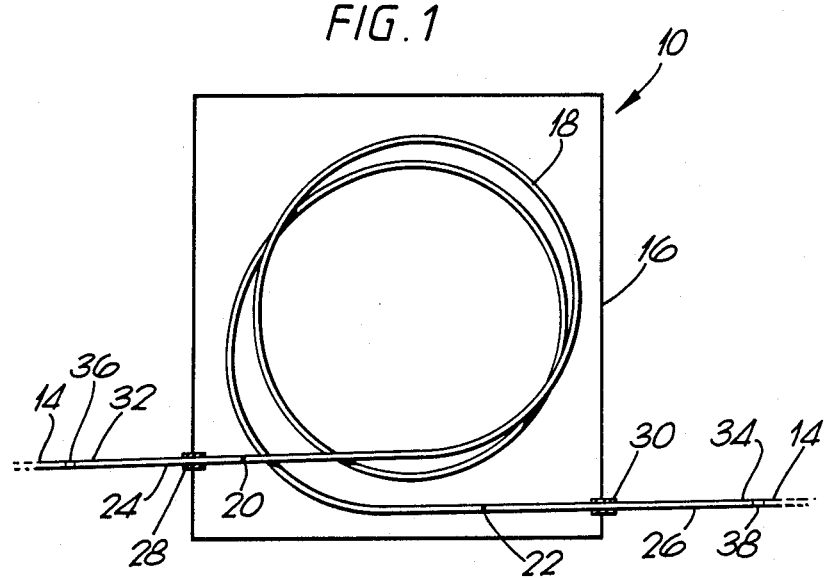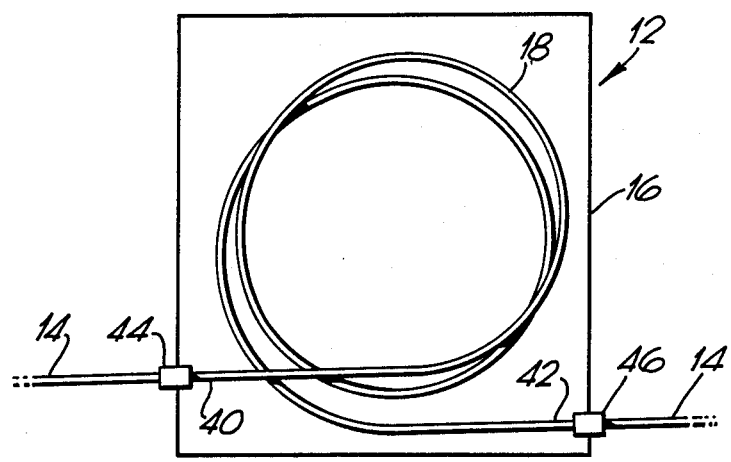

OPTICAL FIBRE ATTENUATORS AND METHOD FOR MAKING SAME

BACKGROUND OF THE INVENTION

This invention relates to attenuators for use with signal carrying optical fibres.

In the manufacture of optical fibres for transmitting optical signals, it is commonplace to include in the silica core (and for some purposes in the cladding) one or more dopant elements such as germanium and phosphorus. It is, of course, critically important to obtain the highest possible optical transmissivity in the fibre core and strict precautions need to be taken during manufacture to exclude contaminants which tend to reduce the transmissivity. Thus, the purity of the source materials (e.g. silicon tetrachloride and germanium tetrachloride) needs to be very high, and the manufacturing process requires strict conditions of cleanliness. There are some known dopants, principally from among the transition elements, which can reduce transmissivity when they are present in one valence state, but have little or no effect on transmissivity when in another (usually higher) valence state. When these elements are used as dopants, precautions are taken to ensure that the elements are kept in the higher valence state to avoid any adverse effect on transmissivity.

In the transmission of optical signals by optical fibres, attenuators are used, for example to equalise optical signals devised from different sources or for the purpose of simulating the presence of a long line when calibrating an optical component or network. These attenuators generally comprise a block of glass with an absorbing coating thereon. Whilst these can be quite satisfactory in practice, they necessarily exhibit up to 4% back reflection in use due to the presence of glass/air interface which results in an increased system signal-to-noise ratio due to light reflected back into the laser cavity. It can be difficult to provide such an attenuator of an exactly required attenuation.

We have now appreciated that optical fibre attenuators can be made very efficiently by modifying the known fibre manufacturing processes in order to ensure the presence of transmission-reducing elements, whereby the fibres so produced instead of being as free as possible of such elements, now deliberately have such elements present to provide significant and useful attenuation properties.

SUMMARY OF THE INVENTION

The present invention provides an attenuating device for use with signal carrying transmitting optical fibres, said device comprising a length of optical fibre of higher attenuation per unit length than the signal carrying fibres with which the device is intended to be used, and means for optically connecting the opposite ends of said length of optical fibre to signal carrying optical fibres.

Preferably said length is coiled within a casing in a substantially mechanically stress free condition.

The attenuation per unit length of the optical fibre of the attenuating device is preferably at least three, and more preferably at least four, orders of magnitude greater than that of the signal carrying optical fibres with which it is intended to be used.

The required attenuation per unit length of the optical fibre of the device may be achieved by the optical fibre having a dopant comprising a variable valency element, such as Ti, V, Cr or Fe, which is present for at least part in a lower valence state.

Preferably the optical fibre of the device has a substantially uniform attenuation through its length, since if this is known the optical fibre may be cut to a predetermined length to provide a required attenuation value.

The connecting means of the device may comprise respective optical fibre tails of attenuation per unit length of the same order as the signal carrying optical fibres with which the device is intended to be used, said tails being fusion spliced to the opposite ends of the optical fibre of the device.

As an alternative said connecting means may comprise respective optical fibre connectors coupled with the opposite ends of the optical fibre of the device and adapted to be coupled to respective signal carrying optical fibres.

The invention also includes a method of producing an optical fibre for an attenuating device as defined above, comprising using as the dopant, or one of the dopants, an element which significantly reduces optical transmissivity in the fibre.

Preferably, said dopant comprises a variable valence element which has a valence state which substantially reduces transmissivity, and wherein the optical fibre is produced such that at least part of the dopant is present in said valence state.

The dopant may be provided using the MCVD modified chemical vapour deposition) process, the OVD (outside vapour deposition) process or the VAD (vapour axial deposition) process.

BRIEF DESCRIPTION OF THE DRAWINGS

In order that the invention may be well understood, two embodiments thereof, which are given by way of example only, will now be described, reference being made to the accompanying drawings in which FIGS. 1 and 2 schematically illustrate respective attenuating devices.

DETAILED DESCRIPTION OF THE INVENTION

Each of the illustrated attenuating devices 10 and 12 in FIGS. 1 and 2 respectively is illustrated connected between two signal carrying optical fibres 14, the attenuation of which is in the order of 1 dB/kilometer as is typical for such optical fibres. Disposed in a casing 16 of each device 10 and 12 is a length 18 of optical fibre of higher attenuation per unit length than the optical fibres 14. For example the attenuation per unit length of the length 18 is at least three, and preferably at least four, orders of magnitude greater than that of the fibres 14. In one specific example of an optical fibre of the device given hereinafter, the attenuation thereof is 25 dB/meter.

The optical fibre for the length 18 has substantially uniform attenuation throughout its length, and thus facilitating cutting the fibre to a length providing a required attenuation value. For example, in the emobodiments the lengths 18 of optical fibre of the devices are cut from fibres having a known attenuation per unit length (which is substantially uniform throughout their lengths) to predetermined lengths to provide required attenuation values.

The length 18 of optical fibre of each device is coiled in its casing in a substantially mechanically stress free condition, to ensure that the attenuation thereof is stable and does not alter due to mechanical stressing of the fibre, either through installation of the fibre in the device or during service. Thus, for example the diameter of the turns of the coiled length 18 is great enough not to cause any substantial mechanical stressing of the fibre and fibre is spaced from the casing. Furthermore, the coiled length of fibre may be supported in the casing by being embedded in a material for example a resin such as epoxy resin filling the casing.

Each device 10 and 12 includes means for optically connecting the opposite ends of the length 18 of optical fibre thereof to the optical fibres 14.

In the device 10 shown in FIG. 1, the opposite ends 20, 22 of the optical fibre length 18 are fusion spliced to respective optical tails 24,26 formed of standard optical fibres, that is of optical fibres of attenuation per unit length of the same order as the signal carrying optical fibres 14. These tails 24, 26 pass out of the casing 16 through respective bushes 28, 30 therein so that their free ends 32,34 are available for fusion splicing to the signal carrying optical fibres 14 as indicated at 36 and 38.

In the device 12 shown in FIG. 2, the opposite ends 40,42 of the optical fibre length 18 are coupled permanently or releasably to respective optical fibre connectors 44,46 fixed to, and extending through, the casing 16. These connectors are adapted to be coupled to the signal carrying optical fibres, either permanently or releasably, and are illustrated as being so connected.

The optical fibre for the lengths 18 in the devices 10 and 12 is made using as the, or one of the, dopants a variable valency element such as Ti, V, Cr or Fe, and so choosing the conditions as to ensure that the element is present for at least part in its lower light-absorbing valence state. For example, the manufacturing process can be operated conventionally but without taking any of the usual precautions to avoid the presence of the lower valence state, so that at least some of the dopant is present in that state.

The MCVD process (i.e. the modified chemical vapour deposition process) may be used to provide the dopant. In this process, gaseous silicon tetrachloride, oxygen and the vapour of one or more dopant compounds are passed into a heated glass tube where pyrolysis occurs and the elements (in oxide form) are deposited on the inner wall of the tube. The tube is subsequently collapsed to provide a preform which is then drawn into a fibre. The deposited materials form the core of the fibre so produced. The MCVD process can be operated for example, using titanium tetrachloride as the dopant vapour, and ensuring that in the deposited core material there is some $Ti^{III}$. This can be achieved by limiting the amount of oxygen present, in order to ensure that the titanium is not fully oxidised. (In conventional procedures, the opposite technique is used, i.e. sufficient oxygen is present to ensure that no $Ti^{III}$ is deposited.)

Other processes can also be used. For example, dopant elements can also be introduced into the porous soot boules produced by the OVD (outside vapour deposition) or VAD (vapour axial deposition) processes. The boules can then be consolidated in a suitably reducing atmosphere to ensure the presence of the dopant in its lower valence state.

Among the dopant elements which can be used to provide attenuation are $Ti^{III}$, $V^{III}$, $Cr^{III}$, and $Fe^{II}$, for example. As a generality, the dopant will normally be selected in any particular case to give optimum light absorbence at the wavelength to be attenuated, for example typically 1300 nm and/or 1550 nm.

The specific example of an optical fibre for use in the devices 10 and 12 referred to above was produced as follows:

The core of a step-index, single mode optical fibre having an undoped cladding was produced by MCVD in which nitrogen was bubbled through titanium tetrachloride and oxygen through silicon tetrachloride to produce the fibre pre-form. The oxygen supply was limited to ensure the presence in the finished fibre core of significant quantities of trivalent titanium.

The resulting fibre had a silica core doped with 2.0% by weight of titanium (expressed as the dioxide), and an undoped silica cladding. It had the following characteristics:

| | |
|---|---|
| Numeric aperture | 0.11 |
| Core size: | 8 microns |
| Overall diameter: | 125 microns |
| Wavelength cut-off | 1200 nm |
| Spot size: | 9.6 microns |
| Attenuation at 1300 nm | 25 dB/meter |
| Attenuation at 1550 nm | 20 dB/meter |

The attenuation per unit length was substantially uniform throughout the length of the fibre being measured at 25.2±0.2 dB/meter at 1300 nm at various points along the length of the fibre.

A 0.5 meter length of the fibre was cyclicly cooled to −30° C. and heated to +60° C. for a week during which its attenuation at 1300 nm varied by only 0.24%. A similar length was heated to +70° C. for one month during which its attenuation at 1300 nm varied by only 0.4%. Thus it will be appreciated that the devices 10 and 12 having optical fibre lengths made in accordance with the example will exhibit substantially stable attenuation characteristics under arduous temperature conditions.

The optical fibre for the devices 10 and 12 can be made in a wide variety of optical characteristics. It is thus possible to choose an optical fibre for the device which is optically a very close match with, and compatible with, the signal carrying fibres with which it is to be used. This possibility of close matching is a very important practical advantage.

It is possible to make the optical fibre for the devices 10 and 12 in a wide variety of attenuations per unit length. That is to say, fibres can be made which have a very high attenuation per unit length and also fibres can be made which have a medium or low attenuation as desired. In this context low attenuation per unit length means at least 1 dB/meter per unit length. There are several advantages arising from this flexibility. Firstly, very high attenuation per unit length enables attenuating devices with a high attenuation value to be made from short lengths of fibre, thus saving costs. Where lower attenuations are needed, a fibre with a lower attenuation per unit length will normally be preferred. If very precise values of attenuation are needed these can be achieved by using a fibre with a relatively low attenuation per unit length and cutting it very accurately to the required length.

I claim:

1. An attenuating device (10.12) for use with single mode signal carrying optical fibres (14), said device comprising a length (18) of single mode optical fibre having a core provided with a dopant comprising a vapour deposited variable valency element which is present for at least part of a lower valence state whereby said core of the optical fibre of the device is of higher attenuation per unit length than the signal carrying fibres with which the device is intended to be used, and means (24,26; 44,46) for optically connecting the opposite ends of said length of optical fibre to signal carrying optical fibres.

2. A device as claimed in claim 1, wherein said length (18) is coiled within a casing (16) in a substantially mechanically stress free condition.

3. Aa device as claimed in claim 1, wherein the attenuation per unit length of the optical fibre thereof is at least three and preferably at least four orders of magnitude greater than that of the signal carrying optical fibres with which it is intended to be used.

4. A device as claimed in claim 1, wherein the dopant comprises $Ti^{III}$, $V^{III}$, $Cr^{III}$ or $Fe^{II}$.

5. A device as claimed in claim 1, wherein the optical fibre thereof has substantially uniform attenuation throughout its length.

6. A device as claimed in claim 5, wherein the optical fibre thereof has a known attenuation per unit length and is of a predetermined length.

7. A device as claimed in claim 1, wherein said connecting means comprises respective optical fibre tails (24,26) of attenuation per unit length of the same order as the signal carrying optical fibres with which the device is intended to be used, said tails being fusion spliced to said opposite ends.

8. A device as claimed in claim 1, wherein said connecting means comprises respective optical fibre connectors (44,46) coupled with said opposite ends and adapted to be coupled to respective signal carrying optical fibres.

9. A method of producing a single mode optical fibre for an attenuating device for use with single mode signal carrying optical fibres, wherein the optical fibre is provided with a titanium doped silica core by a vapour deposition process such that the titanium is present for at least part in its trivalent state whereby to have a higher attenuation per unit length than said signal carrying fibres.

10. A method as claimed in claim 9, wherein the vapour deposition process is a MCVD process.

11. A method as claimed in claim 9, wherein the vapour deposition process is a OVD process.

12. A method as claimed in claim 9, wherein the vapour deposition process is a VAD process.

13. An attenuating device (10.12) for use with single mode signal carrying optical fibres (14) having silica cores, said device comprising a length (18) of optical fibre having a vapour deposited titanium doped single mode silica core, the titanium being present for at least part in its trivalent state whereby said core of the optical fibre of the device is of higher attenuation per unit length that the cores of the signal carrying fibres with which the device is intended to be used, and means (24,26; 44,46) for optically connecting the opposite ends of said length of optical fibre to signal carrying optical fibres.

14. An attenuating device (10.12) for use with single mode signal carrying optical fibres (14), said device comprising a length (18) of optical fibre having a titanium doped single mode silica core provided by a vapour deposition process selected from MCVD, OVD and VAD, the titanium being present in the core for at least part in its trivalent state, whereby the core of the optical fibre of the device is of higher attenuation per unit length than the signal carrying fibres with which the device is intended to be used, and means (24,26; 44,46) for optically connecting the opposite ends of said length of optical fibre to signal carrying optical fibres.

15. A method of making an attenuating device for use with single mode signal carrying optical fibres, comprising providing an optical fibre with a vapour deposited single mode silica core which is provided with a dopant comprising a variable valency element which is present for at least part in a lower valence state whereby said core of the optical fibre is of higher attenuation per unit length than the signal carrying fibres with which the device in intended to be used, cutting a length of said optical fibre corresponding to a desired attenuation value, and providing the opposite ends of said length of said optical fibre with means for optically connecting said optical fibre to signal carrying optical fibres.

16. An optical signal transmission system comprising an attenuating device including a length of single mode optical fibre connected at its respective ends to single mode signal carrying optical fibres, said length of single mode optical fibre having a core provided with a dopant comprising a vapour deposited variable valency element which is present for at least part in a lower valence state whereby said core of said length optical fibre of the device is of higher attenuation per unit length than said signal carrying optical fibres.

* * * * *

UNITED STATES PATENT AND TRADEMARK OFFICE
CERTIFICATE OF CORRECTION

PATENT NO. : 4,881,793

DATED : November 21, 1989

INVENTOR(S) : Tarbox

It is certified that error appears in the above-identified patent and that said Letters Patent is hereby corrected as shown below:

```
Col. 5, line 2, "of" should read --in--;

Col. 5, line 12, "Aa" should read --A--.
```

Signed and Sealed this

Thirtieth Day of October, 1990

*Attest:*

HARRY F. MANBECK, JR.

*Attesting Officer*      *Commissioner of Patents and Trademarks*